United States Patent [19]

Hasegawa et al.

[11] Patent Number: 4,535,847
[45] Date of Patent: Aug. 20, 1985

[54] TRACTOR WITH THREE-POINT LINKAGE CONNECTING SCRAPER THERETO AND AUTOMATIC TILT CONTROL

[75] Inventors: Shigekazu Hasegawa, Sakai; Naoki Okita, Nara; Satoshi Machida, Sakai, all of Japan

[73] Assignee: Kubota, Ltd., Osaka, Japan

[21] Appl. No.: 490,806

[22] Filed: May 2, 1983

[30] Foreign Application Priority Data

Oct. 29, 1982 [JP] Japan ................... 57-191712

[51] Int. Cl.³ .............................................. A01B 65/02
[52] U.S. Cl. ........................................ 172/2; 172/4.5; 172/445.1; 172/446
[58] Field of Search ............ 172/2, 4, 4.5, 9, 10, 172/445.1, 446, 459, 460; 280/446 A; 414/699, 700, 701

[56] References Cited

U.S. PATENT DOCUMENTS

| | | | |
|---|---|---|---|
| 3,731,746 | 5/1973 | Walberg | 172/9 |
| 3,750,757 | 8/1973 | Saetti | 172/9 |
| 4,019,585 | 4/1977 | Dezelan | 172/4.5 |
| 4,120,364 | 10/1978 | Wooldridge | 172/2 |
| 4,276,975 | 7/1981 | Jenkins | 414/700 X |
| 4,337,833 | 7/1982 | Welch | 172/445.1 |
| 4,337,959 | 7/1982 | Bettin et al. | 172/2 X |
| 4,393,942 | 7/1983 | Mijot et al. | 172/2 |

FOREIGN PATENT DOCUMENTS 164277 7/1955 Australia ................. 172/445.1

*Primary Examiner*—Richard T. Stouffer
*Attorney, Agent, or Firm*—Edwin E. Greigg

[57] ABSTRACT

A seated-operator type tractor has a vehicle proper (1), equipped rearwardly thereof with a link mechanism (6) and a scraper (9) for ground-leveling. The vehicle (1) is further provided with: a position-controlling mechanism (34) for controlling up-and-down position of the scraper (9); an automatic control mechanism for maintaining the scraper (9) in its left-and-right horizontal posture, by a sensor (50) therefor; a controlling valve (24) for controlling blade-angle adjustment of the scraper (9); and a manual switch (47) disposed near at hand of the seated operator, for shifting over the vehicle (24).

11 Claims, 8 Drawing Figures

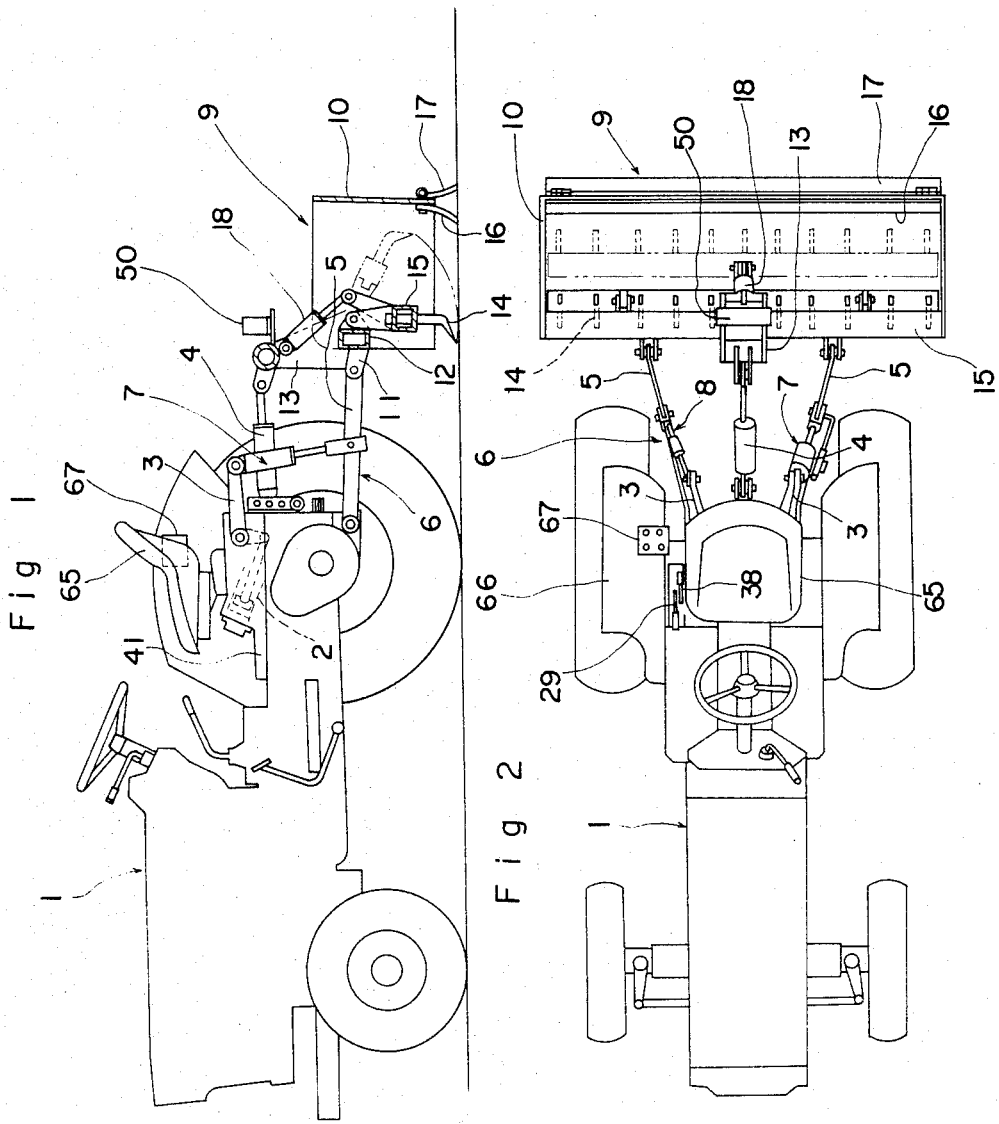

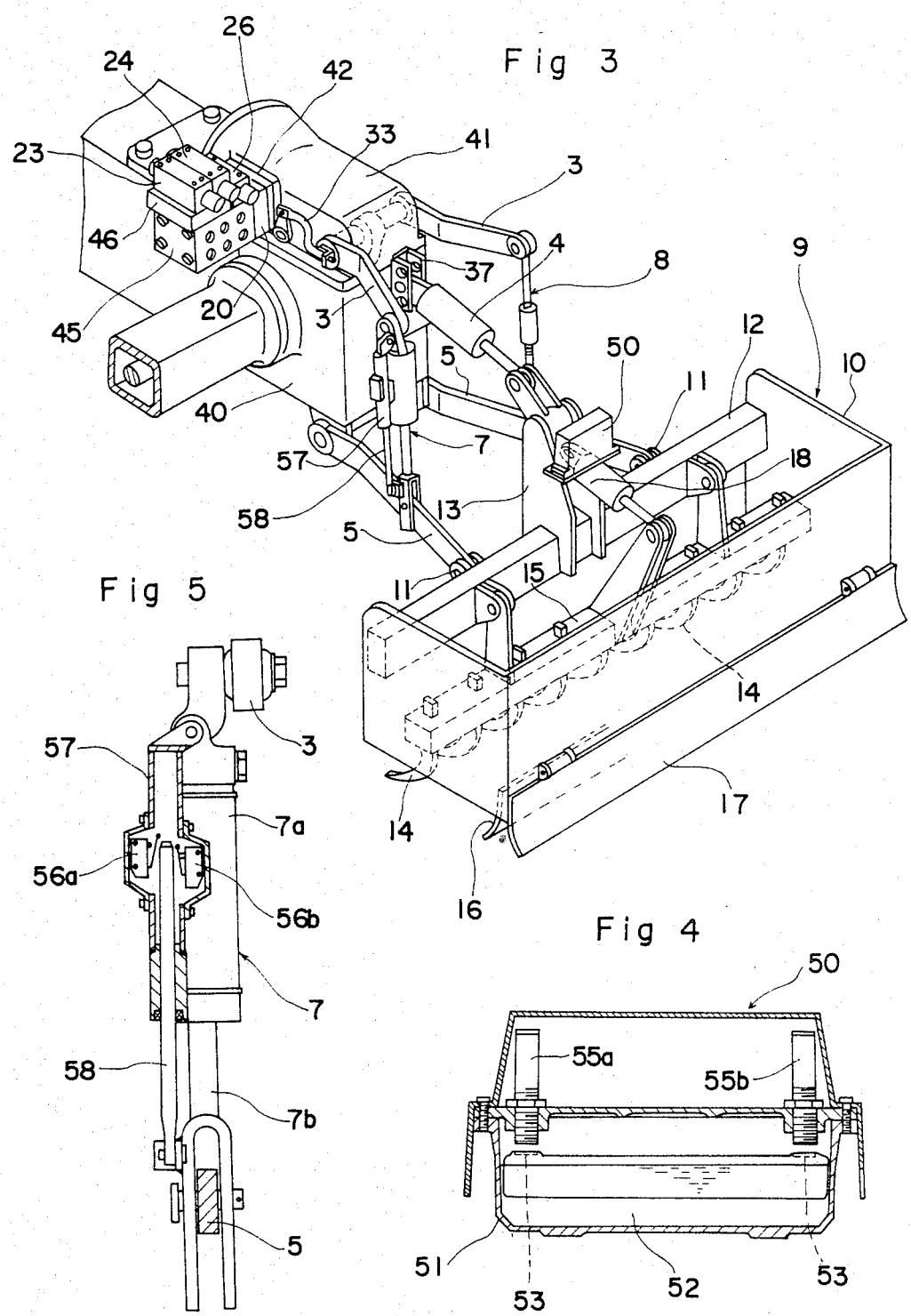

TRACTOR WITH THREE-POINT LINKAGE CONNECTING SCRAPER THERETO AND AUTOMATIC TILT CONTROL

BACKGROUND OF THE INVENTION (1) Field of the Invention

This invention relates to a seated-operator type tractor with a vehicle proper and a scraper; which vehicle is equipped, rearwardly thereof, with a link mechanism that is adopted for implement connection and that is raised and lowered by means of oilhydraulic type lift arms; and which scraper, that is for ground-leveling and that may be of a structure even as simple as substantially a blade, is connected to the link mechanism and is adapted to be subjected to rolling-adjustment by means of an oilhydraulic actuator and to have blade angles as are adjustable by means of another oilhydraulic actuator.

(2) Description of the Prior Art

With a tractor equipped with a scraper for ground-leveling, of the structure as above, the ground-leveling work using the scraper has conventionally been difficult in its maneuvering and has required skill in a considerable degree, in view that it has been prevailing to control the oilhydraulic actuator for the adjustment with respect to rolling and the oilhydraulic actuator for the blade-angle adjustment, with respect to their actuation, respectively by means of manual type 3-position controling valves, therefore in order to adjust the working position and posture of the scraper and additionally thereto to maneuver, in raising and lowering, the lift arms, three kinds of manual maneuvering have thus been imposed on the operator who must of course operate and steer the vehicle as well. Especially, level-finishing has been the most difficult step, such that even a skilled operator must repeat the treatment four or five times in order to attain the results satisfactory enough, thus requiring considerable time in such finishing step which has therefore been the one hampering enhancement of the working efficiency.

SUMMARY OF THE INVENTION

This invention has as its object to provide a tractor with a scraper for ground-leveling, with which even a relatively less-experienced operator can cope with the level-finishing by means of the scraper—that has thus conventionally been considered to extremely be difficult—in good precision and yet in short time and in good efficiency.

The implement of the tractor of the type mentioned at the beginning, in order to attain of the type mentioned at the beginning, in order to attain the object, comprises further provision of:

a position-controling mechanism which raises and lowers said lift arms to target positions corresponding to maneuvered positions of a position-controling lever disposed near at hand of the seated operator and which causes same to automatically halt upon reaching the target positions;

a sensor adapted to detect left and right slant postures of the said scraper or the vehicle;

an automatic control mechanism which actuates, according to the detection results of the sensor, the oilhydraulic actuator for the adjustment with respect to rolling and thereby maintains the scraper in its left-and-right horizontal posture;

a controling valve which controls the oilhydraulic actuator for the blade-angle adjustment; and a maneuvering means disposed near at hand of the seated operator for maneuvering the valve from the operator's seat.

The thusly improved tractor relieves the operator from the maneuvering for the left-and-right horizontal adjustment as would otherwise have to be effected most frequently and as would have been the most difficult maneuvering, and therefore the operator has simply to perform at suitable times, while driving the vehicle, the maneuvering to correct the height level of the scraper relative to the ground, as may vary and alter on account of pitching of the vehicle owing to undulations in the traveling direction of the vehicle, by means of raising and lowering the lift arms, and the maneuvering to adjust the blade angle in proper accordance with the scraping soil volume and the soil property; thus to remarkably enhance the maneuverability in contrast to conventional tractors.

To be noted here further is that adjusting the raising and lowering of the lift arms is by means of the position-controling, and is therefore far easier in its fine adjustment than by means of ON/OFF manipulation of the lever.

It has been demonstrated that the level-finishing in sufficiently good precision is attained with the tractor according to this invention simply by effecting the treatment twice or so, thus to remarkably enhance the working efficiency.

Still further advantages of this invention will become apparent from the detailed description to follow hereunder.

BRIEF DESCRIPTION OF THE DRAWINGS

The drawings show, by way of example, an embodiment of the tractor with a scraper for ground-leveling, according to this invention, in which:

FIG. 1 is an overall side elevation;

FIG. 2 is an overall plan view;

FIG. 3 is a perspective view of a tractor body rear portion;

FIG. 4 is a rear end view, in vertical section, of a slant sensor;

FIG. 5 is a rear end view, in vertical section, of a liftrod length detection;

DESCRIPTION OF THE PREFERRED EMBODIMENT

Figure 6:
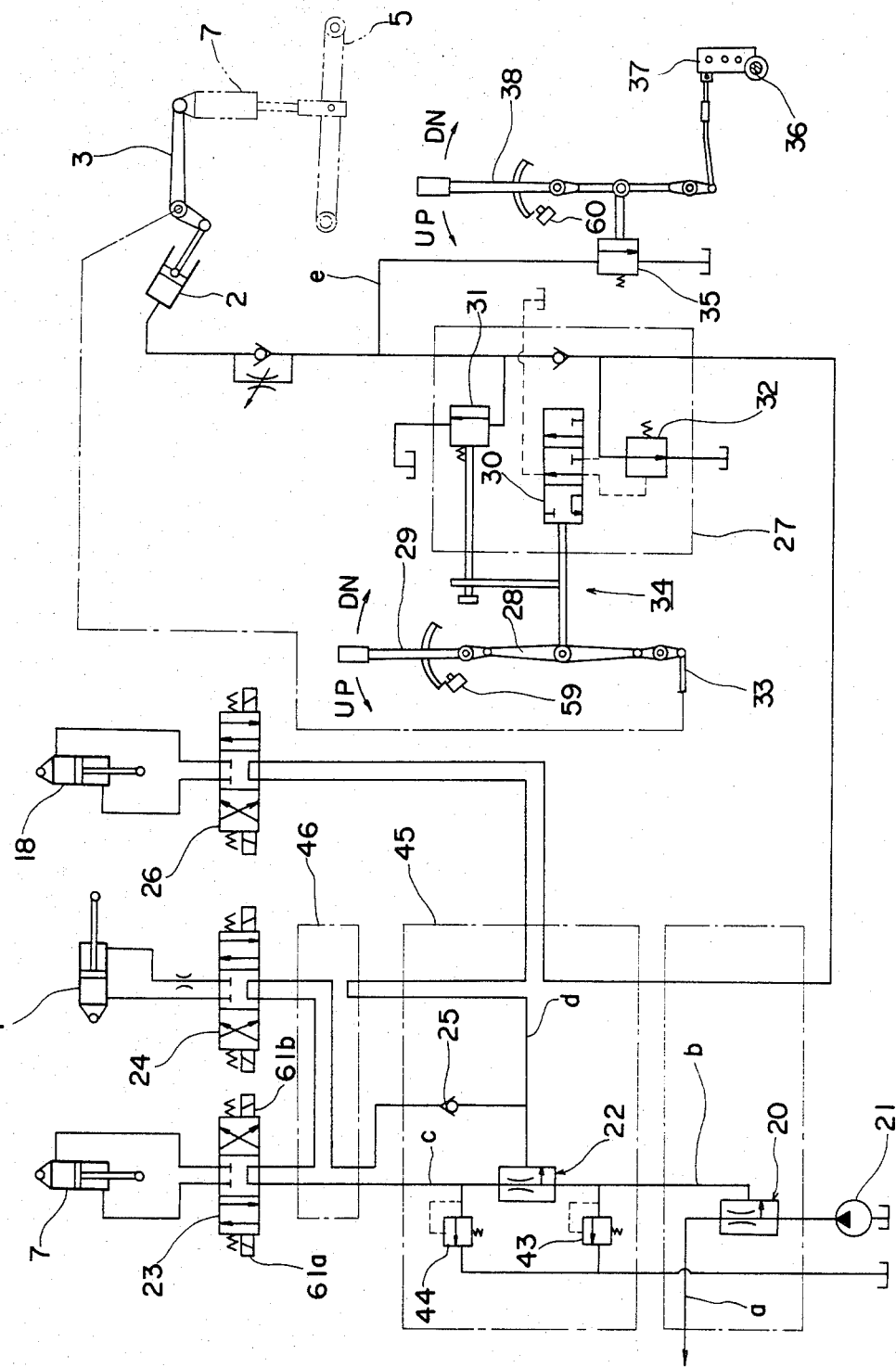
FIG. 6 is an oilhydraulic circuit diagram.

Rearwardly of a tractor proper or vehicle (1) as shown in FIGS. 1 and 2, there are mounted a pair of left and right lift arms (3) which are driven by a single-acting type oilhydraulic cylinder (2), to thus rockingly move up and down as an integral unit, and there is attached a three-point link mechanism (6) consisting of a top link (4) and a left and a right lower links (5). The left and right lift arms (3) and lower links (5) are articulately interconnected on either side by means of the respective lift rods (7 and 8). A ground-leveling scraper (9) of box-like shape is connected to the respective rear ends of the lower links (5) and the top link (4). In the illustrated specific embodiment, the lefthand lift rod (7) is constructed as a double-acting type oilhydraulic cylinder, while the righthand lift rod (8) is constructed as turnbuckle as is adjustable in expansion and contraction, and the top link (4) is constructed also as a double-acting type oilhydraulic cylinder.

The ground-leveling scraper (9) is thus adapted to be driven in raising and lowering in its overall entirety by means of the lift-arm cylinder (2); to be actuated in left and right cylinder (7); and to be modified in its fore-and-aft pitching slant posture by means of extension and constraction of the top link cylinder (4).

Looking into the detailed construction of the ground-leveling scraper (9), with reference also to FIG. 3, it has, as its main constituent member, a transversely elongate box-like frame (10). In a front region of the frame there is transversely journaled a stay (12) with brackets (11) for articulated connection with the respective lower links (5). On this stay (12) there is securely attached an upright mast (13) for articulated connection with the top link (4). Within the box-like frame (10) there is transversely journaled a frame (15), made of a rectangular pipe, to which a multiplicity of scarifiers (14) are juxtaposedly attached. To a rear-end lower rim portion of the box-like frame (10) there are attached a securely fixed blade (16) and a blade for rearward running travel which is rockable in retaction rearwards and upwards. An oilhydraulic cylinder (18) is provided so as to rockingly drive the scarifier-attached frame (15), to thus maneuver the scarifier (14) in protrusion and retraction from a front-end lower region of the box-like frame (10). It is noted, however, that the ground-leveling work may as well be carried out even substituting such simple structure substantially only of a blade, for the complicated scraper (9) as described hereinabove.

Now, reference is made to FIG. 6 and the oilhydraulic controling circuit illustrated there for the oilhydraulic cylinders (2,4,7,18) as mentioned hereinbefore is described hereunder.

Designated at (20) is a first flow-priority valve to receive pressurized oil supply from a pump (21) which is supposed to be driven by a tractor-mounted engine. It has a controlling port (a), supposed to send cut a constant rate of oil out of the pump supply, connected to an oilhydraulic controlling circuit of a non-illustrated forward-and-rearward-running-travelchange-over mechanism of oilhydraulic clutch type; and a surplus port (b), to send out the surplus oil, connected to a second flow-priority valve (22) which has, as illustrated, ports (c,d) as correspond to the respective ports (a,b) mentioned hereinabove. The port (c) is connected in serial manner to an electromagnetic controling valve (23), which takes charge of actuation of the lift-rod cylinder (7), and another electromagnetic controling valve (24) which takes charge of actuation of the top-link cylinder (4). Returning oil from these oilhydraulically serial electromagnetic valves (23,24), via a check valve (28), is merged in the pressurized oil sent out from the port (d). The merged pressurized oil, thus the reunited total oil of the surplus-oil output through the first flow-priority valve (20), is supplied to a further electromagnetic controling valve (26) for the oilhydraulic cylinder (18) for the scaifier protrusion and retraction, and further thereafter the pressurized oil is supplied to a valve (27) controling the position of the lift-arm cylinder (2).

The position-controling valve (27) has its constituents: a main spool (30) and a poppet valve (31), which are interlocked with a position-controling lever (29) via a spool-actuating lever (28); and an unloader valve (32). Thus, when the controling lever (29) is rockingly maneuvered, then the main spool (30) and the poppet valve (31) are accordingly shifted over and the lift arms (3) are raised or lowered. Such displacement of the lift arm (3) is transmitted via a feedback link (33) to the spool-actuating lever (28), so this position-controling mechanism designated as a whole at (34) is such that when the lift arms (3) rise and lower to predetermined positions corresponding to the maneuvering positions of the controling lever (29), it then automatically halts same.

As illustrated, there is provided a control valve, as designated at (35), for the draft control during plowing work, such that its oil path (e), which is in communication with the lift-arm cylinder (2), is opened and closed in accordance with fore-and-aft rocking movement of a top-link braket (37), that is attached to a rear face of a transmission case (40) via a tension bar (36), responsive to increase and decrease of the traction load; and that the lift arms (3) are then stably maintained in such balanced state that the inner pressure of the lift-arm cylinder (2) correspond properly to the present traction load value. To be noted here is the fact, however, that it is prerequisite, for actually effecting such draft control, to always provide the pressurized oil to the lift-arm cylinder (2) from the position-controling lever (27), therefore to set the position-controling lever (29) as maneuvered to its raising limit position. As is clear from the illustration, it is possible, by maneuvering a draft-controling lever (38) which is supposed to be disposed in juxtaposition to the position-controling lever (29), to accordingly alter the displacement amount of the top-link bracket (37) when in the aforementioned balanced state, thus to adjust the traction load, namely the cultivation depth of the plowing work. On the other hand, it is prerequisite, for effecting the position control of the lift arms (3), to always keep closed the draft-controling valve (35), therefore to set the draft-controling lever (38) as maneuvered to its raising limit position.

How to mount the aforementioned various controling valves is best shown in FIG. 3 and is now described hereunder in some detail. To a rear portion upper surface of the transmission case (40) there is secured an upper lid case (41) accommodating therein the lift-arm cylinder (2) as seen in FIG. 1. The position-controling valve (34) is attached on the inner surface of this lid case (41). The first flow-priority valve (20) is mounted to a left flank of this lid case (41), with a spacer (42) interposedly inserted therebetween. To an outer flank of this valve (20) there in turn is mounted a valve block (45) incorporating therein the second flow-priority valve (22), a main relief valve (43) and an auxiliary relief valve (44), which are shown in FIG. 6 and whose function is obvious therefrom without any particular comment therefor. The electromagnetic controling valve (26) for the scarifier protrusion and contraction is mounted directly on the upper surface of the valve block (45). The electromagnetic controling valve (23) for the lift-rod cylinder and the electromagnetic controling valve (24) for the top-link cylinder are mounted again on the upper surface of the valve block (45), with a plate (46) having oil paths therein interposedly inserted therebetween. It is supposed that the lid case (41) has an inlet port to receive the pressurized oil from the pump (21), that the pressurized oil is therefrom supplied to the first flow-priority valve (20) through an inner oil path, and that outlet ports of the electromagnetic controling valves (23, 24, 26) are provided, all of them, on a rear-end surface of the valve block (45) and are pipedly connected to the corresponding oilhydraulic cylinders (7,4,18 respectively).

Figure 7:
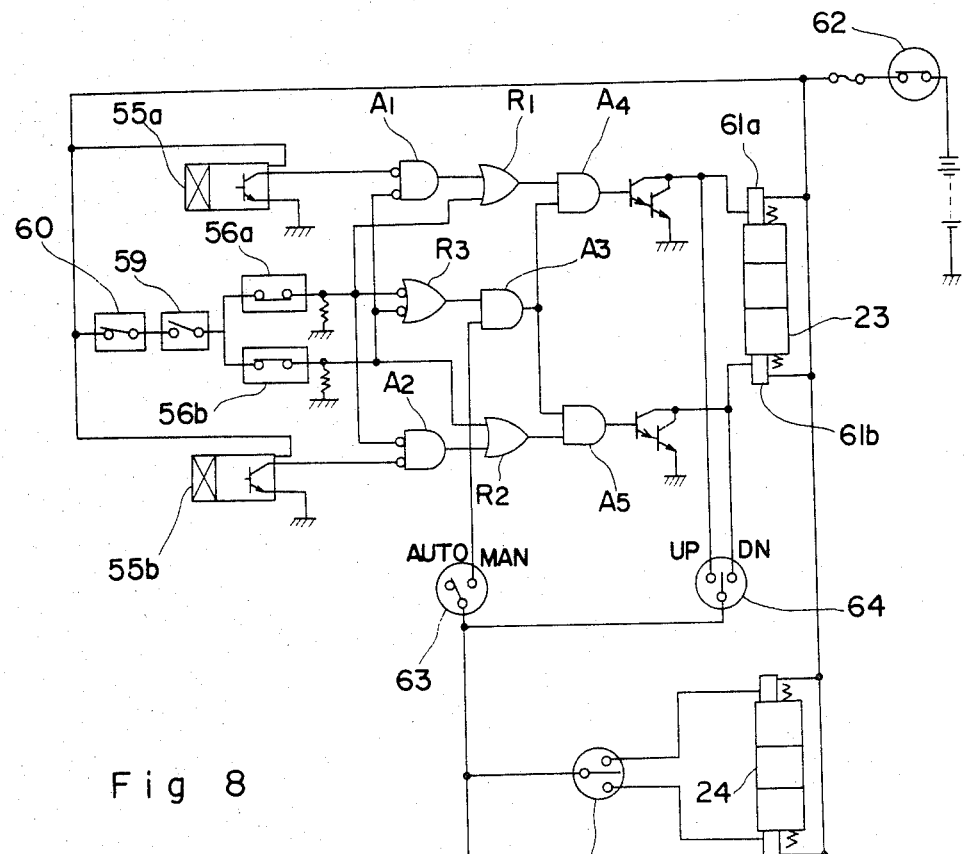
FIG. 7 is a diagram of a driver circuit for electromagnetic controling valves.
Figure 8:
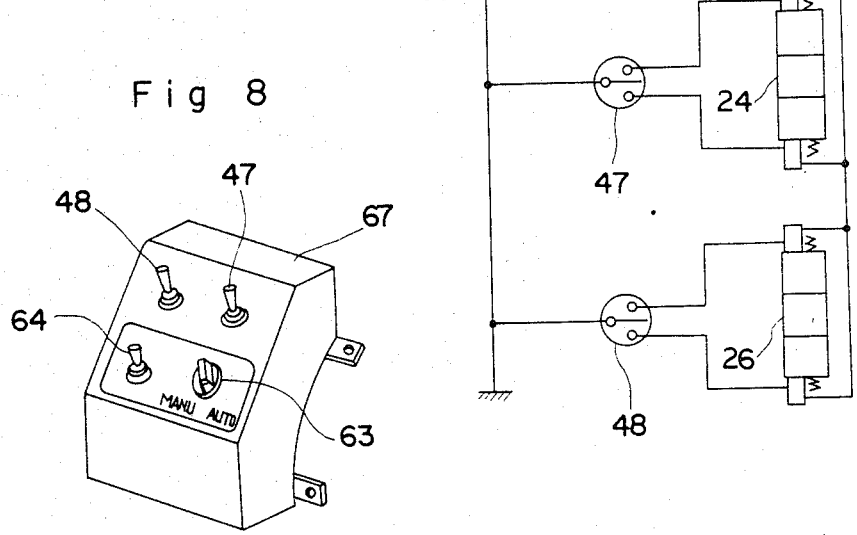
FIG. 8 is a perspective view of a controing box.

As is seen from FIGS. 7 and 8, the electromagnetic controling valve (24), which is for the top-link cylinder (4) as described hereinbefore, and the electromagnetic controling valve (26), which is for the oilhydraulic cylinder (18) for the scarifier protrusion and contraction, are maneuverable in forward-and-reverse shifting over by means of manual switches (47,48, respectively) of neutral-restoring type.

On the other hand, the electromagnetic controling valve (23), which is for the lift-rod cylinder (7), is automatically controled so as to maintain horizontal the ground-leveling scraper (9), in a manner as is described hereunder in some detail:

To the mast (13) for the top-link jointing, there is mounted a sensor (50) adapted to detect the fact that the scraper (9) tilts or is transversely slant off its horizontal posture beyond a predetermined range. As is shown in FIG. 4, this sensor (50) has a sensor case (51) confining therein an antifreezing liquid (52) of suitable viscosity. A transversely elongate float (54), for instance made of a plastic material and freely floating on the liquid, has, in its upper surface near both left and right end portions, magnetism-sensitive metal pieces (53). The case (51) is also equipped with a pair of proximity switches (55a,55b), as are secured to left and right portions of its ceiling wall in such fashion as are properly opposed to the respective metal pieces (53). As is thus obvious, if and when the scraper (9) tilts in left or right slanting beyond the predetermined insensitive range, then a respective metal piece (53) approaches sufficiently close to the corresponding proximity switch (55a or 55b) and such condition is thus electrically sensed. It further is obvious that the sensor (50) may as well be mounted on the part of the tractor proper or the vehicle (1), just to result in similarly attaining the detection purpose.

On the other hand, reference is now made to FIG. 5 showing the lift-rod cylinder (7) in an enlarged scale. On the part of a cylinder casing (7a) thereof, there is mounted a switch case (57) accommodating therein a normally-closed type switch (56a) and a normally-open type switch (56b); while on the part of a piston rod (7b) thereof, there is mounted a switch-maneuvering rod (58) inserted into the switch case (57) for free protrusion and retraction. Here, the locational interrelation of these switches and the maneuvering rod is such that when the lift-rod cylinder (7) is in a state of being balanced in length with the righthand lift rod (8) then only the normally-open type switch (56b) is abuttedly maneuvered by the maneuvering rod (58), per the illustration, and when departing from this state towards the retraction side then both the switches (56a,56b) are abuttedly maneuvered commonly by the maneuvering rod (58), while when departing towards the protrusion side then the rod (58) comes commonly off both the switches (56a,56b).

Referring back to FIGS. 6 and 7, a normally-open type switch (59) is disposed in a vicinity of the position-controling lever (29) so as to be actuated by the movement thereof thus for sensing the fact that the lever (29) is within a predetermined maneuvering range near the lift-arm raising limit; while another normally-open type switch (60) is disposed in a corresponding manner in a vicinity of the draft-controling lever (38), which in turn is disposed as mentioned hereinbefore in juxtaposition to the position-controling lever (29), for similarly sensing the fact that the lever (39) is within a predetermined maneuvering range near the raising limit.

As is seen in FIG. 7, the proximity switches (55a,55b), the pair of switches (56a,56b) for the cylinder-position detection, and the switches (59,60) for the lever-position detection, are electrically incorporated in a controling circuit for driving solenoids (61a,61b), respectively on the cylinder contraction and extension sides, of the electromagnetic controling valve (23) for the lift-rod cylinder (7). Designated in FIG. 7 at (62) is a main switch, at (63) is an AUTO/MANUAL mode-shifting switch, and at (64) is an automatically neutral-restoring type manual switch for manually actuating, in extension and contraction, the lift-rod cylinder (7). This circuit, incorporating the various switches as mentioned, is incorporated in a controling box (67) which is illustrated in FIG. 8 in its outer appearance and which is attached to an upper surface of a rear-wheel fender (66) in the illustrated instance at the righthand lateral side of an operator's seat (65) of the tractor proper or vehicle (1) as roughly shown in FIG. 2. The seated operator may thus conveniently effect the switch-maneuvering while rearwardly restoring the body in a posture to vigilantly watch the grounleveling scraper (9).

Operation of the controling circuit is now described hereunder in some detail.

When automatic horizontally control of the ground-leveling scraper (9) is desired, the working height level of the scraper (9) is suitably set by means of properly maneuvering the position-controling lever (29); the main switch (62) is turned on; and the mode-shifting switch (63) is set in "AUTO" position.

Under proper setting as above, if and when the scraper (9) is in the left-and-right horizontal posture, then both the proximity switches (55a,55b) of the slant-sensor (50) are respectively off, with their output commonly in "H", i.e. logical HIGH, thus to result in that outputs of AND gates ($A_1, A_2$) are both "L", i.e. logical LOW. Besides, since the position-controling lever (29) is not within its maximum raising range, the switch (59) is cut open. therefore, outputs of OR gates ($R_1, R_2$) are "L", output of another OR gate ($R_3$) is "H", and output of another AND gates ($A_4, A_5$) for triggering the respective transistors are "L", so neither of the solenoids (61a,61b) is energized and the electromagnetic controling valve (23) is held in neutral.

Here, if and when the vehicle (1) tilts in leftwards uprising slant beyond the predetermined insensitive range angle, then the righthand proximity switch (55b) alone is turned on in the sensor (50), and its output is thus shifted to "L". In consequence hereof, the output of the AND gate ($A_2$) is shifted to "H", and so the output of the OR gate ($R_2$) also to "H". Since the output of the AND gate ($A_3$) here remains to be "H", the output of the AND gate ($A_5$) for triggering the transistor becomes "H". Accordingly, the solenoid (61b) is energized and so the electromagnetic controling valve (23) is shifted over to extend the lift-rod cylinder (7), thus to the slant-correcting side, namely to urge the scraper (9) to restore its horizontal posture. As so urged, when the scraper (9) is thus restored to come back within the present horizontal range, the proximity switch (55b) is turned off and so the controling valve (23) is restored to neutral and the extending actuation of the cylinder (7) thus halts.

Conversely, if and when the vehicle (1) tilts in leftwards descending slant, then the lefthand proximity switch (55a) alone is turned on in the sensor (50), and accordingly the solenoid (61a) is energized and the cylinder (7) is actuated in contraction until the scraper (9) is restored to come back within the present horizontal range.

As is thus clear from the above, the scraper (9) is maintained horizontal, regardless of any tilting in the left-and-right slant of the vehicle (1).

On the other hand, while retaining this "AUTO" mode, if the scraper (9) is raised up by maneuvering the position-controling lever (29) to the raising limit, then the switch (59) is turned on by means of the lever (29). In this instance, since it is here supposed as mentioned hereinbefore as prerequisite conditions that the switch (60) has prior hereto been turned on by means of the draft-controling lever (38), the output of the OR gate (R$_3$) is then caused to alter in accordance with the actuation status of the switches (56a,56b) for the respective cylinder-position detection.

At the time when the switch (59) is turned on as mentioned above, suppose first that the lift-rod cylinder (7) is then in a state to be shorter than the righthand lift rod (8), namely that the scraper (9) is in the leftwards uprising state. In such case, both the switches (56a,56b) are abuttedly actuated by the rod (58), thus the switch (56a) is cut open and the switch (56b) is made closed. Accordingly, the output of the switch (56a) in such case is "L" and the output of the switch (56b) is "H". In consequence hereof, the solenoid (61b) is energized, and so the lift-rod cylinder (9) is actuated in extension. the extension thus goes on until a state where the switch (56b) alone remains as is abutted on by the maneuvering rod (58), whereupon the outputs of both the switches (56a,56b) come commonly to "H". In consequence hereof the output of the OR gate (R$_3$) and further the output of the AND gate (A$_3$) come to "L", and thus the output of the AND gate (A$_5$) accordingly shifts over to "L". Therefore, the solenoid (61b) is deenergized, and so the controling valve (23) is restored to neutral. Thus, automatic adjustment is effected such that the left and right lift rods (7,8) have the same length and the scraper (9) is secured in its posture of such left and right even height levels relative to the vehicle (1). Contrary to the first supposition as above, suppose secondary that at the time when the switch (59) is turned on, the lift-rod cylinder (7) is then in a state to be longer than the righthand lift rod (8), namely that the scraper (9) is in the leftwards descending state. In such case, both the switches (56a,56b) commonly come of the maneuvering rod (58), thus the switch (56a) is made closed and the switch (56b) is cut open. In this case, the solenoid (61a) alone is energized, and so the lift-rod cylinder (7) is actuated in contraction. The contraction thus goes on until the state where the switch (56b) alone is abutted on by the maneuvering rod (58) and is thereupon halted in a manner just the same as in the first-supposed extension case.

As is thus seen, if and when the scraper (9) is raised high to a great extent in order for instance to turn around the vehicle at the end portion of the working field, then the scraper (9) is automatically sustained in its posture parallel to the vehicle base, with the left and right height levels relative to the vehicle (1) being the same and even.

When manual control of the scraper posture is desired, without any automatic control functioning, then the mode-shifting switch (63) is set or shifted to "MANUAL" position. Then the output of the AND gate (A$_3$) comes to "L" and so the outputs of the AND gates (A$_4$,A$_5$) are maintained to be "L" regardless of the signals from the sensor (50), and therefore the controling valve (23) may now be actuated only by means of the ON/OFF maneuvering of the manual switch (64).

By the way, the construction according to this invention may as well be modified for instance as follows:

1. Electrical sensing means for instance of potentiometer type may be provided for sensing the maneuvering position or state of the position-controling lever (29) and the rocking angle of the lift arms (3), to thus construct an electric type position-controling mechanism.

2. The left-and-right slanting sensor (50) may be of analog-output type and may be mounted on the part of the vehicle (1); and the lift-rod cylinder (7) may be provided with an analog-output type stroke-sensor; thus to provide a rolling-slant controling means for controling the left-rod cylinder (9) extension and contraction in analog manner towards an analog target stroke of the lift-rod cylinder (7) as operationally calculated, in response to the detected slant tilting angle, for restoring the scraper (9) to its horizontal posture.

3. The electromagnetic controling valve (24) of the top-link cylinder (4) may be of electrical position-control type, such that the cylinder length may freely be adjusted by means of maneuvering a variable resistor conveniently at the operator's seat, to thereby adjust the blade angle accordingly freely.

By the way, it is noted as to the blade-angle adjustment that the structure according to this invention as described hereinbefore and illustrated in the accompanying drawings, with the controling valve (24) for this adjustment as is adapted to be maneuvered electromagnetically, has the advantage in that the maneuvering as may conveniently be effected near at hand of the seated operator is lighter and thus quit rapid without much delay and excellent in precision, in contrast to using a manually-operated mechanical-type controling valve.

We claim:
1. A tractor comprising:
   a tractor body;
   a scraper;
   a three-point linkage means for connecting said scraper to said tractor body, said linkage means including a top central link means and left and right lower link means;
   a pair of lift arm means connected to said left and right lower link means, a hydraulic operated cylinder connected to said lift arm means for raising and lowering said scraper;
   a position controlling mechanism, a hand lever operatively connected thereto, said controlling mechanism being adapted to control said hydraulic operated cylinder to raise and lower said scraper to a position corresponding to a position selected by said hand lever and which automatically retains said scraper in said position;
   a first hydraulic actuator included in one of said pair of lift arm means for rolling adjustment of said scraper;
   a sensor for detecting right and left slant postures of said scraper, said sensor generating a tilt detection signal; and
   an automatic control mechanism responsive to said tilt detection signal for actuating said first hydraulic actuator for automatically correcting the slant posture of said scraper.

2. The tractor of claim 1 wherein said top central link means includes a second hydraulic actuator for blade angle adjustment of said scraper relative to a vertical line.

3. The tractor of claim 2 wherein said position controlling mechanism includes
a position control valve means hydraulically connected between a source of pressurized fluid and said hydraulic operated cylinder for raising and lowering said scraper and
a swingable lever means operatively connected to said position control valve means for operating said valve means to regulate fluid flow to said hydraulic operated cylinder from said fluid source,
said swingable lever means having one end portion linked to said hand lever and another end portion linked to a feedback link means which transmits elevational displacement of said lift arm means to the swingable lever means.

4. The tractor of claim 3 which includes a control valve hydraulically connected between said fluid source and said position control valve means for operating said second hydraulic actuator for blade angle adjustment.

5. The tractor of claim 4 including remote control means disposed at an operator's station for electromagnetically operating said position control valve means.

6. The tractor of claim 3 including draft control means, said draft control means comprising a fluid path (e) hydraulically connected to said hydraulic operated cylinder, a control valve interposed in said fluid path for opening and closing said fluid path, means for transmitting deviations in a predetermined traction load acting on said top link means, and operating means operatively connected between said means for transmitting deviations and said control valve responsive to the transmitted deviation for operating said control valve to balance an inner pressure of said hydraulic operated cylinder and the predetermined traction load so that lift arm means are stably maintained.

7. The tractor of claim 6 including control lever means for adjusting any deviation transmitted to said operating means.

8. The tractor of claim 2 further including switch means connected to said automatic control mechanism for detecting the presence of said manually operated lever at a lift arm raising limit position and for generating a position detection signal, said automatic control mechanism responsive to said position detection signal becoming non-responsive to said tilt detection signal from said tilt detection means.

9. The tractor of claim 8 further including sensing means mounted on one of said lift arm means including said first hydraulic actuator and connected to said automatic control mechanism for sensing unbalanced length produced in said pair of lift arm means and for generating a tilt detection signal, said automatic control mechanism responsive to said position detection signal and said tilt detection signal from said sensing means for actuating said first hydraulic actuator to correct the slant of said scraper.

10. The tractor of claim 9 wherein said sensing means comprises a rod mounted on one of said lift arm means including the first hydraulic actuator so as to be moveable therewith and two switch means adapted to be urgingly operated by said rod and connected to said automatic control mechanism for cooperatively sensing unbalanced length produced in said pair of lift arm means to generate a tilt detection signal.

11. The tractor of claim 10 wherein each of said lift arm means includes an adjustable link.

* * * * *